(12) United States Patent
Gurney et al.

(10) Patent No.: US 7,881,726 B2
(45) Date of Patent: Feb. 1, 2011

(54) METHOD AND APPARATUS FOR SPECTRUM SHARING BETWEEN AN INCUMBENT COMMUNICATIONS SYSTEM AND A COGNITIVE RADIO SYSTEM

(75) Inventors: David P. Gurney, Carpentersville, IL (US); Apoorv Chaudhri, Sunrise, FL (US); Yadunandana N. Rao, Sunrise, FL (US); Matthew E. Simms, Davie, FL (US)

(73) Assignee: Motorola, Inc., Schaumburg, IL (US)

( * ) Notice: Subject to any disclaimer, the term of this patent is extended or adjusted under 35 U.S.C. 154(b) by 731 days.

(21) Appl. No.: 11/831,601

(22) Filed: Jul. 31, 2007

(65) Prior Publication Data

US 2009/0034508 A1 Feb. 5, 2009

(51) Int. Cl.
*H04Q 7/20* (2006.01)
(52) U.S. Cl. .............. 455/454; 455/414.1; 455/414.2; 455/552.1; 370/338
(58) Field of Classification Search .............. 455/501, 455/454, 412.1, 414.1, 177.1, 186.1, 509, 455/62, 450, 414.2, 420; 370/351, 278, 280, 370/281, 462, 454, 338; 375/240.03, 260, 375/132, 224; 709/224; 386/83; 725/87
See application file for complete search history.

(56) References Cited

U.S. PATENT DOCUMENTS

| 6,138,118 | A  | * | 10/2000 | Koppstein et al. | ............... | 1/1 |
| 2005/0080796 | A1 | * | 4/2005 | Midgley | ............... | 707/100 |
| 2006/0084444 | A1 | * | 4/2006 | Kossi et al. | ............... | 455/450 |
| 2007/0226274 | A1 | * | 9/2007 | Nishino | ............... | 707/204 |
| 2008/0010208 | A1 | * | 1/2008 | Callaway | ............... | 705/57 |
| 2008/0153419 | A1 | * | 6/2008 | Buris et al. | ............... | 455/62 |
| 2008/0228834 | A1 | * | 9/2008 | Burchall et al. | ............ | 707/202 |
| 2008/0268892 | A1 | * | 10/2008 | Hamdi et al. | ............... | 455/522 |
| 2009/0061779 | A1 | * | 3/2009 | Gurney et al. | ............ | 455/63.1 |

OTHER PUBLICATIONS

PCT International Search Report Application No. PCT/US2008/071525 Dated Dec. 1, 2008—16 Pages.
Wendong Hu et al: Cognitive Radios for Dynamic Spectrum Access—Dynamic Frequency Hopping Communities for Efficient IEEE 802.22 Operation. Dated May 1, 2007—8 Pages.
Youping Zhao et al: Applying Radio Environment Maps to Cognitive Wireless Regional Network. Dated Apr. 1, 2007—4 Pages.
Youping Zhao et al: OverHead Analysis for Radio Environment Mapenabled Cognitive Radio Networks. Dated Sep. 1, 2006—8 Pages.
ET Docket No. 04-186, "Unlicensed Operation in the TV Broadcast Bands", FCC NPRM, pp. 13-17, May 25, 2004—5 Pages.

* cited by examiner

*Primary Examiner*—Tan Trinh
(74) *Attorney, Agent, or Firm*—Barbara R. Doutre

(57) ABSTRACT

Efficient frequency spectrum sharing between at least one incumbent communication system(s) (102, 152) and at least one cognitive radio (CR) system (105) is provided. The incumbent system's system parameters and CR system's operational requirements are copied to a mirrored database (106B). The mirrored database (106B) is controlled by a either a central authority (108) or a database manager having delegated authority (508). The mirrored database (106B) is accessed by the CR system (105). The mirrored database (106B) can be modified and updated by the central authority (108) or delegated database manager (508) to correct for interference detected in the incumbent system caused (152) by the cognitive radio system (105). The cognitive radio system (105) utilizes the updated mirrored database (106B) to avoid interfering with the incumbent system (102, 152) to determine CR system operating parameters thus enhancing the ability to share spectrum.

13 Claims, 6 Drawing Sheets

METHOD AND APPARATUS FOR SPECTRUM SHARING BETWEEN AN INCUMBENT COMMUNICATIONS SYSTEM AND A COGNITIVE RADIO SYSTEM

FIELD OF THE INVENTION

The present invention relates generally to communication systems and more particularly to controlling cognitive radio systems to enable spectrum sharing and to avoid or limit interference with incumbent communication systems.

BACKGROUND

In the wireless communications arena, an incumbent user is generally defined as any existing user of frequency spectrum. Such users may be considered as licensed, primary, secondary or unlicensed users of a frequency band. Cognitive radio is a paradigm for wireless communication in which either a network or a wireless node changes its transmission or reception parameters to communicate efficiently and utilize spectrum on a secondary basis without interfering with the incumbent users of a frequency band. This alteration of parameters is based on the active monitoring of several factors in the external and internal radio environment, such as radio frequency spectrum usage, user behavior and network state.

Regulatory bodies, such as the Federal Communications Commission (FCC), maintain significant amounts of information pertaining to incumbent transmitters and systems in a variety of frequency bands. These official databases contain information about each incumbent transmitter's operating parameters (e.g., effective radiated power, antenna pattern, antenna height above average terrain, transmitter location, etc.). Actual achieved incumbent receiver performance in the presence of CR interferers poses a large concern to regulators. Television Broadcasters (the primary licensees of the TV bands) have expressed great concern about the potential for CR interference to their broadcast services. There is also concern about the extent of services that can be provided by CR systems and whether these services will be acceptable to users due to the limiting regulatory environment within which CR systems are to operate. Determining maximum allowable interference levels for incumbent receivers is also a challenging task, due to the wide variety of (such as TV for example) receiver equipment providers on the market, and different operating conditions.

Accordingly, there is need to facilitate spectrum sharing between an incumbent communication system and a cognitive radio system.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
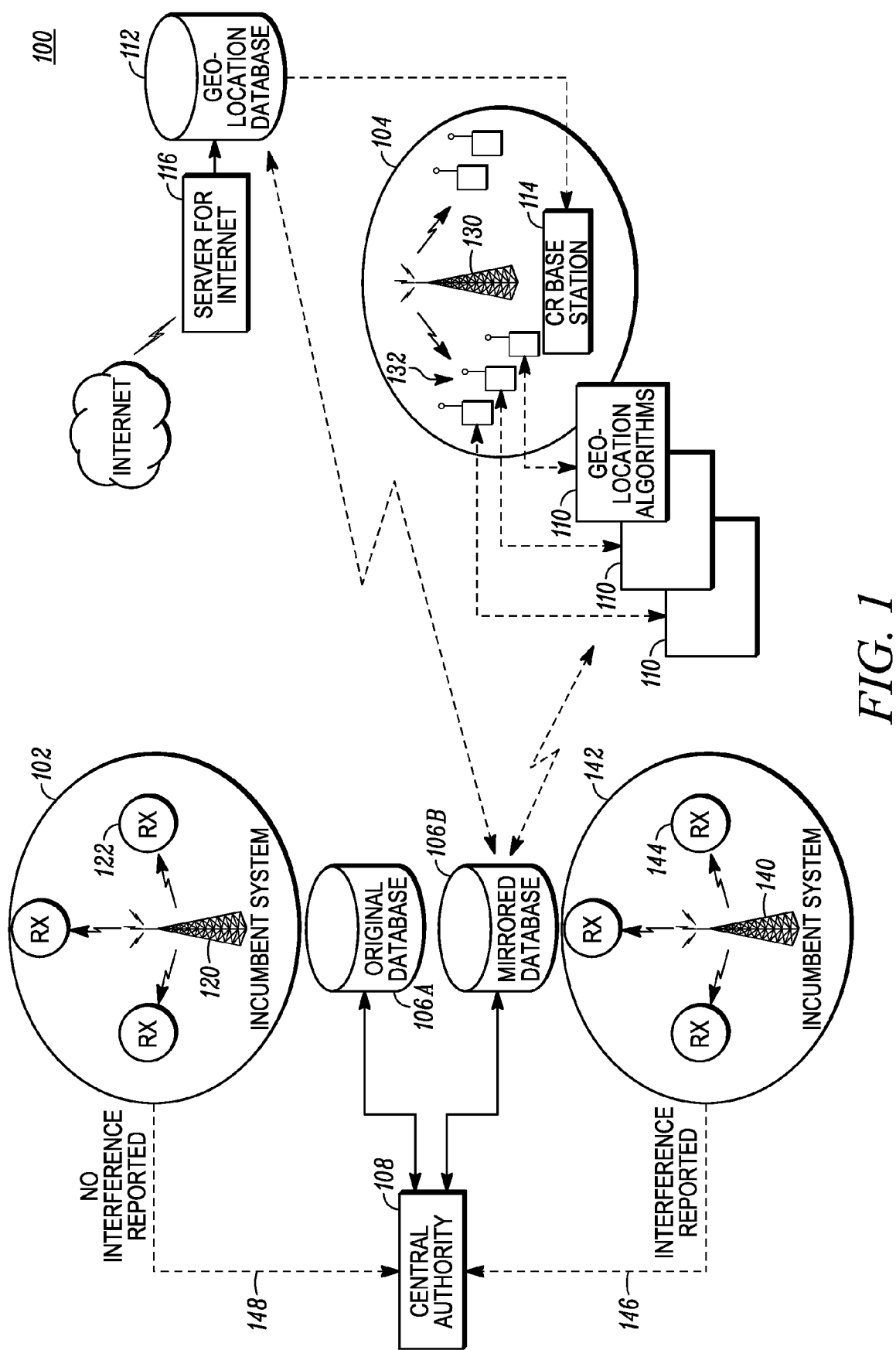
FIG. 1 illustrates a plurality of communication systems operating in accordance with some embodiments of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components utilizing incumbent system information to adapt, modify or update operating parameters of a cognitive radio (CR) system. For the purposes of this application the term "incumbent system" is defined as a communication system having known information about existing operating parameters that is allowed to operate in the band. Incumbent systems may be considered as the (primary or secondary) licensed users of a band, or an incumbent user may be considered to be any pre-existing user (e.g., quasi-licensed or unlicensed) user of a band. For example, TV broadcasters are considered as the licensed primary incumbent users of the television bands, and certain wireless microphones are considered as the licensed secondary incumbent users of the television bands.

An incumbent's system parameters (e.g., effective radiated power, antenna pattern, antenna height above average terrain, transmitter location, etc.) can be utilized along with official cognitive radio (CR) operating Regulations and Policies to determine critical CR system operating parameters (such as allowable frequencies and maximum allowable transmission power) based on the system's geographic location. CR system operating parameters can be calculated in real-time, or computed off-line and stored in a geo-location database (as described below). Geo-location databases can be utilized for any CR system or band where information is known about incumbent (higher priority) transmitters or systems.

Cognitive Radios (CRs) utilize geo-location data to determine the relative locations of incumbent (e.g., licensed or primary) transmitters and their prospective receivers in order to compute CR system operating parameters, such as a set of useable frequencies and maximum CR system transmit power allowed by Federal/Regional Regulations at a particular time in a geographical location. For example, the FCC has proposed a large set of non-interference requirements that must be met to operate within the TV bands in the US. The determination of maximum allowed CR system transmit power (or other CR operating parameters) is typically based on various (primary service) non-interference requirements and generally accepted propagation models. Generally accepted propagation models, however, only provide statistical average data for signal reception, and are subject to errors in the field due to a variety of reasons (e.g., terrain variations, antenna variations, etc.).

For the purposes of this application "system parameters" includes transmitter information, receiver information and other system operation information. Adapting the incumbent system parameters and CR operating requirements, as will be described herein, effectively extends or reduces protection levels to the incumbent communication system and promotes the efficient sharing of frequency spectrum. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions involved in modifying mirrored cognitive operating parameters to avoid interference between the incumbent system and the cognitive system. The non-processor circuits may include, but are not limited to, a radio receiver, a radio transmitter, signal drivers, clock circuits, power source circuits, and user input devices. As such, these functions may be interpreted as steps of a method for communication systems to share spectrum. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Briefly, in accordance with the invention, there is provided herein a means for communication systems to share frequency spectrum. A method is provided that intelligently adapts a mirrored version of an incumbent communication system's operating parameters, such as licensed transmitter information and allowable interference levels, to improve CR system operation in the field. The method provides a means to greatly alleviate the incumbent system's interference concerns, and facilitates the adoption of CR systems.

FIG. 1 illustrates a plurality of communication systems 100 operating in accordance with some embodiments of the invention. The plurality of communication systems 100 includes incumbent communication systems 102, 142, cognitive radio system 104 and central authority 108. In accordance with these embodiments, cognitive radio system 104 efficiently shares frequency spectrum with incumbent communication systems 102, 142 without interfering with the incumbent systems. Each of the incumbent communication systems 102, 142 include a main transmitter 120, 140 respectively and a plurality of receiving devices 122, 144 respectively. Cognitive radio system 104 includes a transmitter 130 a plurality of cognitive radio units 132, preferably transceiver devices, and base station 114.

In accordance with an embodiment of the invention, the incumbent communication system 102 operates using operating parameters governed by the central authority 108. Examples of the central authority include any Official, Federal, or Regional Regulatory or management body, such as the FCC or other officially designated bodies. The incumbent system's operating parameters are recorded in an official database which will be referred to as original or reference database 106A. The original database 106A generally contains incumbent system parameters. Incumbent system parameters include transmitter parameters, such as radiated power, protected service contour level, antenna height, antenna patterns, transmitter location, etc. Incumbent system parameters may also include incumbent receiver parameters, such as tolerable co-channel interference levels, allowable adjacent channel interference levels, etc. The original database 106A may also be extended to contain operating requirements for cognitive radio systems 104 (e.g., maximum allowed operating power, allowable out-of-band emissions, propagation modeling requirements, etc.). Cognitive radio requirements may also be maintained separately (apart from original database 106A). The central authority 108 typically maintains the original database 106A, and in accordance with the invention, mirrors (or copies) all or a portion of that database, to mirrored database 106B. Those skilled in the art recognize that there is more than one way to copy or mirror the information from original/reference database 106A with no loss of generality. For example, database 106A may be augmented with additional (adjustable) fields representing the original data, thereby effectively representing the copied or mirrored database 106B.

Figure 2:
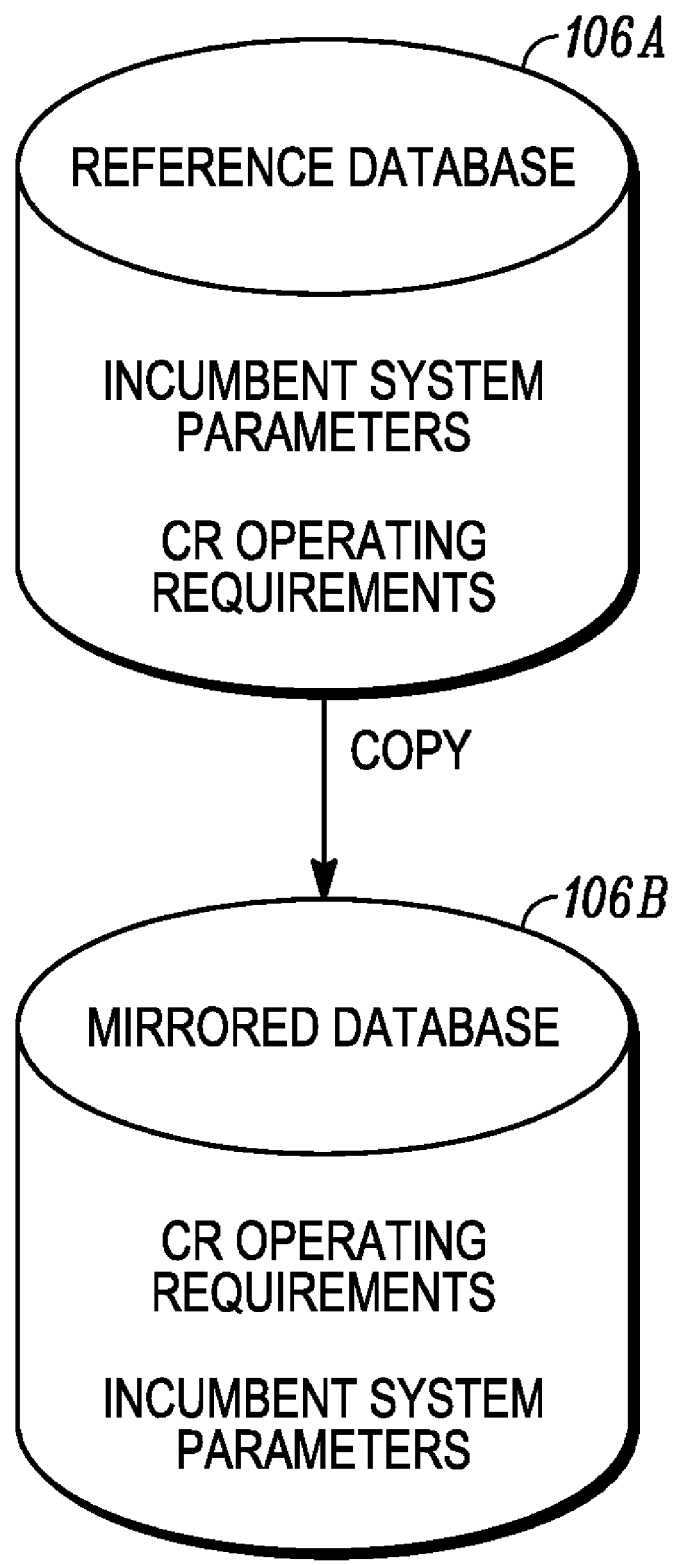
FIG. 2 illustrates a reference database and a mirrored database in accordance with some embodiments of the invention.

Referring briefly to FIG. 2 there is shown, reference database 106A and mirrored database 106B in accordance some embodiments of the invention. In this example, the reference database 106A includes incumbent operating requirements, CR operating requirements and incumbent system parameters. The mirrored database 106B includes a copy of the CR operating requirements and the incumbent system parameters.

In accordance with the invention, central authority 108 updates the mirrored database 106B in response to interference conditions detected in the incumbent communication system 102 from the cognitive communication system 104. Any updates or modifications to system parameter information typically occur in the mirrored database 106B in the preferred embodiment, so as not to disturb the official or original incumbent system information. Note that the central authority may occasionally alter information in the original database as part of normal operations (e.g., when a new station is added to the database). This information is in turn reflected in the mirrored database 106B. The cognitive radio communication system 104 (indirectly or directly) accesses the updated system parameters of the central authority's mirrored database 106B and determines its allowable operating parameters, thereby minimizing interference and optimizing frequency spectrum sharing with the incumbent communication system 102 (see below). Examples of CR system operating parameters that are determined through the use of the mirrored database 106B are maximum CR system transmit power, available frequencies, and operating bandwidth. CR system operating parameters are determined in the CR (or geo-location database) based on data in the mirrored database and the current CR unit location In accordance with the embodiment of FIG. 1, incumbent communication system 142 detects interference by the CR system 104. Incumbent system 142 reports 146 the interference to the central authority 108. The central authority 108 verifies the interference and modifies the parameters in mirrored database 106B to alleviate the interference condition between incumbent system 142 and CR system 104. Incumbent communication system 102, on the other hand does not detect interference by the CR system 104. Thus, no interference is reported 148 to the central authority 108 and mirrored database 106B may remain unchanged as to the operating requirements and incumbent system parameters contained therein that impact CR communication system 102.

In accordance with some embodiments of the invention, the central authority 108 may also choose to modify the mirrored database 106B to affect CR system operation. For example, the central authority 108 may relax the interference requirements for cognitive radio systems (e.g., allow higher CR system transmit power) to expand CR system coverage areas 104 if no interference is observed to incumbent systems 102, 142. Thus, individual cognitive radios 132 operating within CR system 104 can be modified for different operating requirements. The different scenarios of spectrum sharing will also be discussed later in conjunction with FIG. 3. Similarly, field measurements taken by the CR systems can be reported to the central authority, which can be used to modify the Cognitive Radio operating requirements, rules and policies.

In accordance with this embodiment, the cognitive radios 104 utilize (directly or indirectly) geo-location databases 112 or algorithms 110 as the primary means of determining key CR operating parameters. Geo-location databases 112 and algorithms 110 generally refer to an apparatus that the CR uses to determine its system parameters (e.g., transmit power) based on its current location. Geo-location databases 112 and algorithms utilize information from the central authority's mirrored database 106B to determine CR system operating parameters. This data can be pre-computed and stored (locally) on the internet (as in 112) or in the CR. It may alternatively be computed in real-time in the CR (as in 110) upon scene arrival/location change. Note that these geo-location algorithms typically reside in each location-enabled cognitive radio unit.

Geo-location databases can be stored in a base station radio unit 114 (for smaller regions), or they may be downloaded from a global (e.g. internet-based) server 116 (for larger regions), depending on system coverage requirements. Geo-location database 112 or algorithms 110 can be utilized to determine if CR transmissions are permitted at a particular location (or set of locations), and at what power level such transmission are permitted (given the location and mobility of network nodes) given the CR system operating requirements and incumbent system parameters. The resulting CR system operating parameters, such as allowable transmit power, are determined by the application of the central authority's rules/specifications (i.e., operating requirements) for CR system operation, and the database 106B of incumbent communication system parameters (along with propagation modeling). The use of geo-location databases 112 or algorithms 110 is advantageous to a user in that it results in much larger spectral availability (or higher spectrum utilization) for CR services as compared to non-geo-location enabled approaches (e.g., sensing-only CRs).

Figure 3:
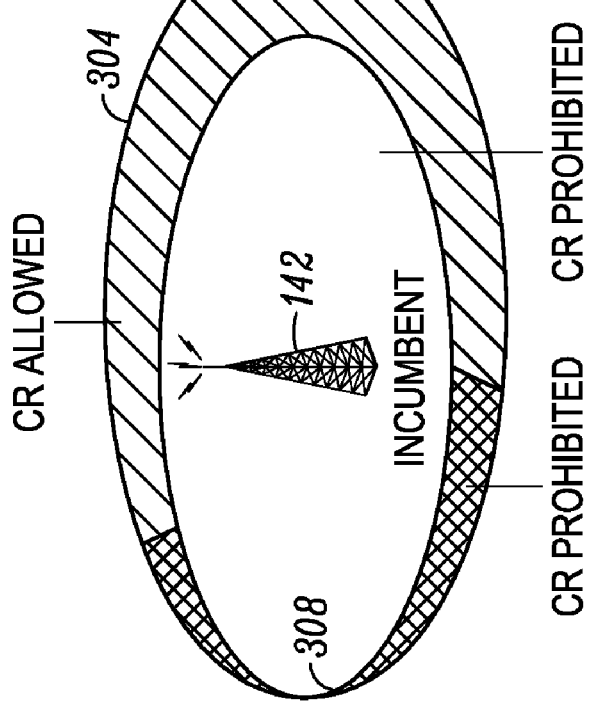
FIG. 3 illustrates an example of communication coverage diagrams in with accordance with some embodiments of the invention.
Figure 3:
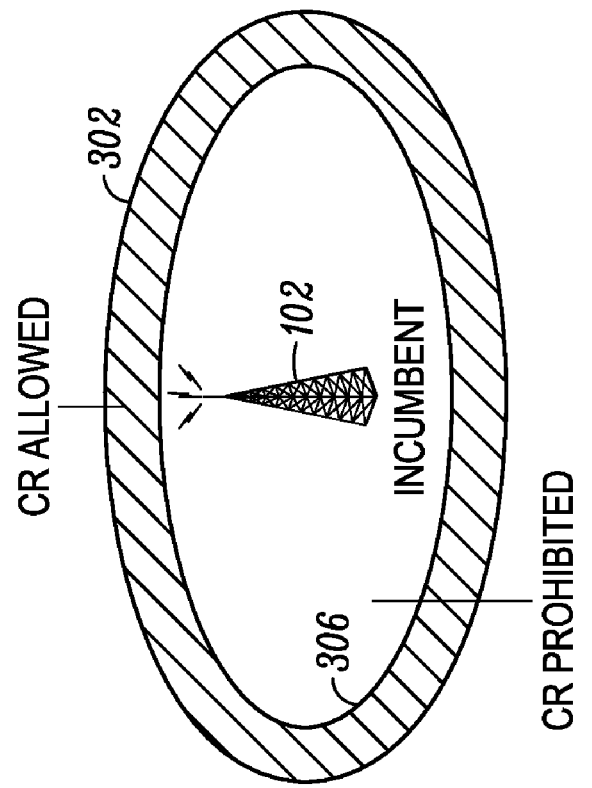

FIG. 3 illustrates two example scenarios 302, 304 in which the incumbent communication systems 102, 142 of FIG. 1 share spectrum with cognitive radio system 104. In scenario 302, no interference is detected and the incumbent communication system 102 co-exists with the CR communication system 104 operating at a lower power level. The CR system 104 might even be operating at the same frequency as incumbent system 102, but due the lower power levels or geographic distance between transmitters no interference occurs. Thus, the mirrored database parameters 106B typically remain unchanged. In scenario 304, on the other hand, certain units from CR communication system 104 have interfered with incumbent system 142, and thus the mirrored operating parameters 106B have been modified such that the CR operation is prohibited or otherwise limited within a certain geographic area 308 so as to alleviate interference. Hence, utilizing an accessible and modifiable mirrored database 106B of incumbent operating parameters provides interference control allowing incumbent systems 102, 142 to co-exist with cognitive system 104. Note that there are several methods available to adjust mirrored database 106B information so as to limit or alter CR system operation. For example, incumbent system parameters such as a protected service contour level, an antenna pattern or effective radiated power may be altered to extend or reduce the incumbent's protected service area. Likewise, CR system operating requirements such as maximum allowable power, co-channel, or adjacent channel interference levels may be adjusted to control CR system emissions (and interference levels).

Figure 4:
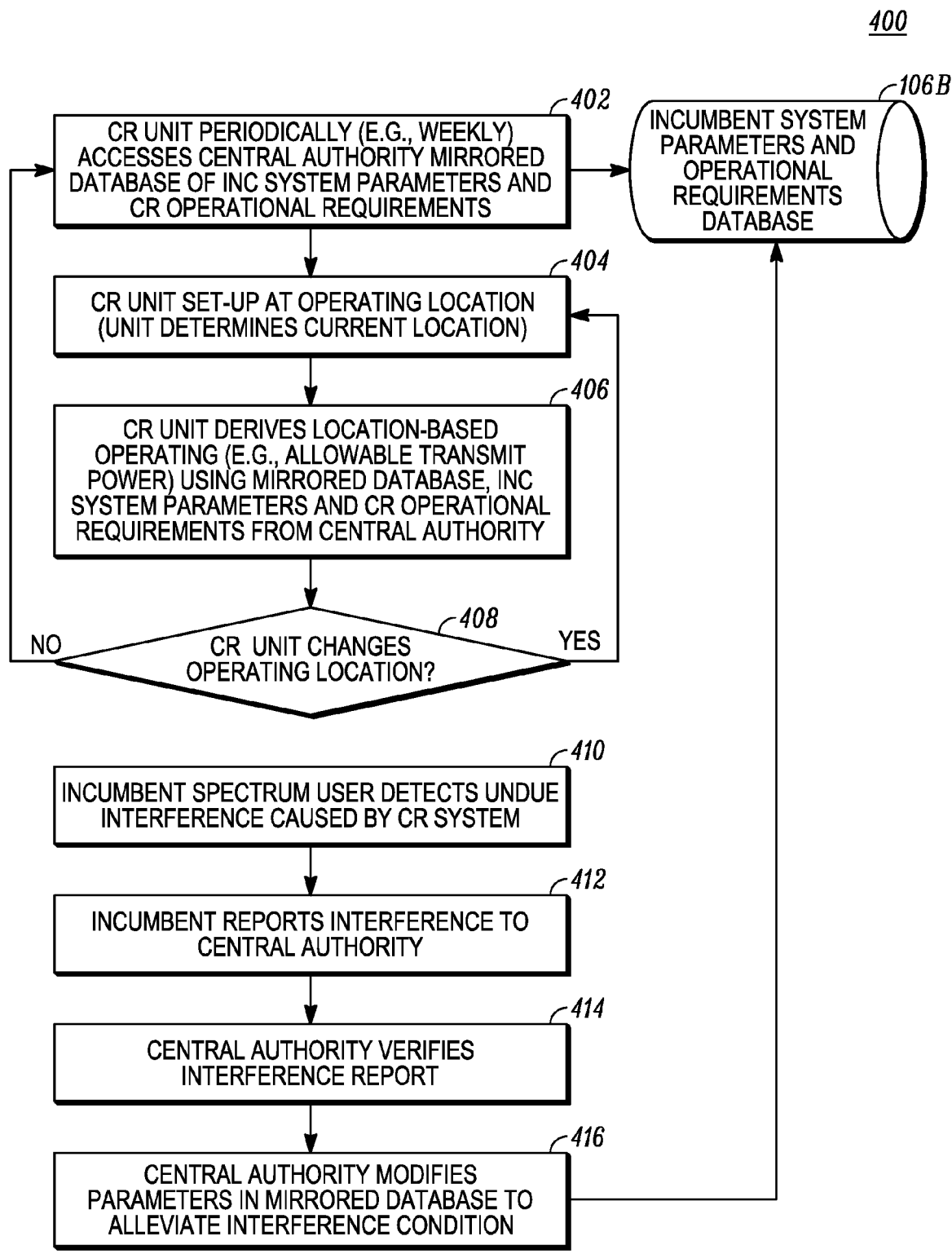
FIG. 4 illustrates a flowchart of a method for alleviating interference to an incumbent communication system from a cognitive radio system in accordance with some embodiments of the present invention.

FIG. 4 illustrates a flowchart of a method for sharing spectrum between an incumbent communication system and a cognitive radio system in accordance with some embodiments of the present invention. Method 400 will be described in conjunction with elements from FIG. 1. As illustrated by the two main groupings of steps in method 400, the incumbent communication system 102 and cognitive radio system 104 operate independently of each other but have a means for reporting interference to the central authority. Note that for the purposes of this discussion that the central authority is in general any designated authority (official, delegated or otherwise) that is charged with maintaining or updating the database. At step 402, CR units utilizing geo-location databases or algorithms operating within CR communication system 104, periodically access the central authority database 106B to acquire a copy of the incumbent system parameters and CR operational requirements. As a CR unit 132 is set up, the CR unit determines its current operating location at step 404. This position determination can be achieved via Global Positioning Satellite (GPS) means, or other location determination means known in the art. Once the CR unit 132 has determined its operating location at step 404, the CR unit 132 derives location-based CR operating parameters using a geo-location database or algorithm means 406 (see also 112, 110), which utilizes the mirrored database parameters and CR operational requirements gathered at step 402 that were accessed from the central authority database 106A.

If the CR unit 132 changes operating location step 408, then the new operation location is determined back at step 404 and a new set of location based CR system operating parameters are derived using the mirrored incumbent system parameters and CR operational requirements at step 406. If no change in CR unit location occurs at step 408, operation continues with the current operating parameters and the CR unit returns back to step 402 for periodic mirrored database access from the central authority.

If incumbent communication system 102 detects interference by the CR system at 410, the incumbent system reports the inference to the central authority 108 at 412. The central authority 108 verifies the interference at 414. Verification of interference can be accomplished for example, by using a reference receiver and transmitter. The central authority 108 (or delegated authority 608 as will be described in FIG. 6) modifies the parameters in mirrored database 106 to alleviate the interference condition (in step 416). These modified parameters are then accessed by CR unit 132 upon the next periodic access 402 to the central authority 108. Accordingly, method 400 provides an interference control technique which allows incumbent systems and cognitive radio systems to co-exist and efficiently share frequency spectrum.

Figure 5:
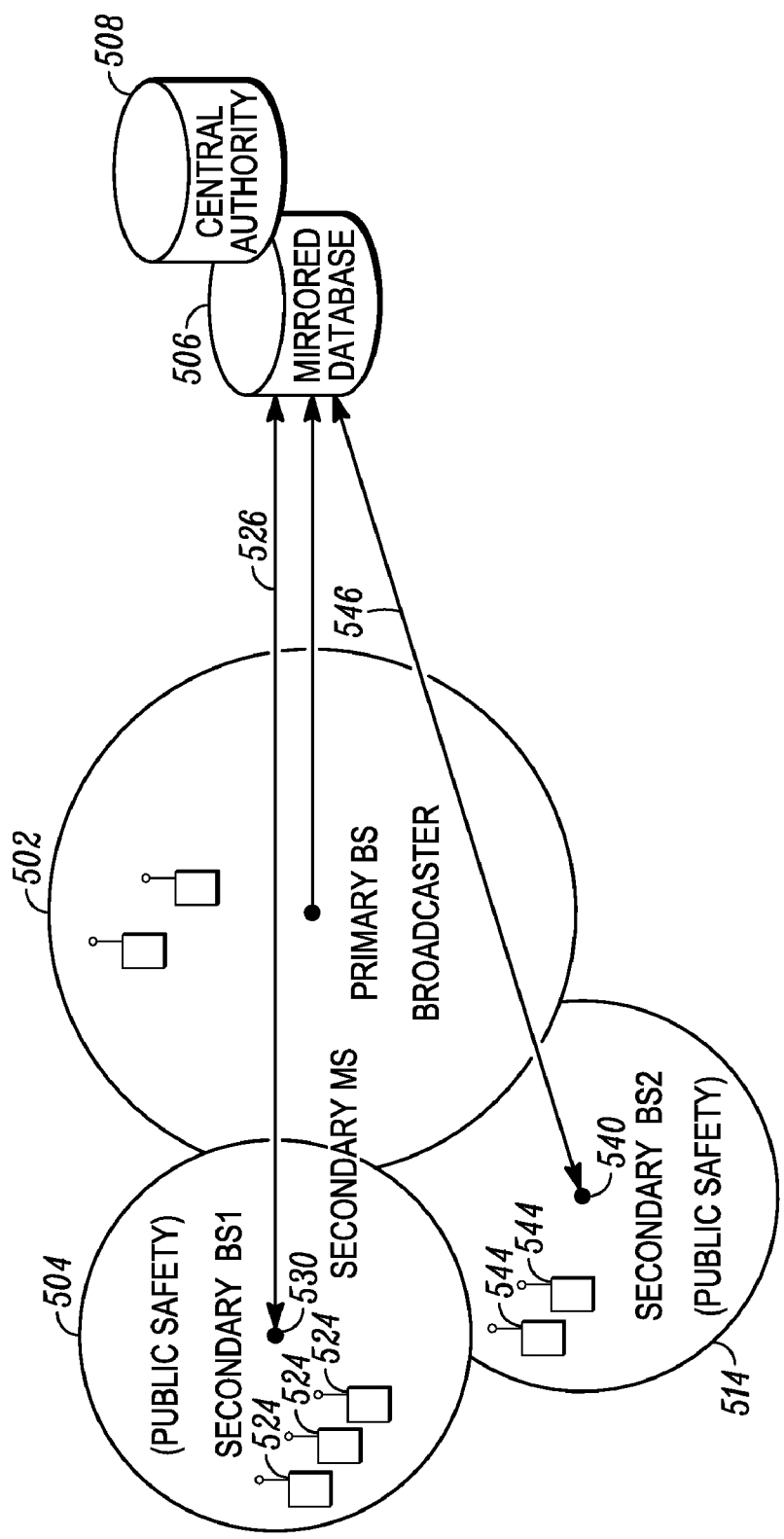
FIG. 5 provides an example of an incumbent communication system and a plurality of cognitive radio systems sharing spectrum in accordance with some of the embodiments of the invention.

FIG. 5 provides an example of an incumbent communication system and a plurality of cognitive radio systems sharing spectrum in accordance with some of the embodiments of the invention. In this embodiment, the incumbent communication system is embodied by primary licensee 502, such as a television broadcaster, operating under regulations set and maintained by a central authority 508, such as the FCC. The cognitive radio communication system is embodied by secondary systems 504, 514, such as public safety radios 524, 544 with base stations 530, 540. The central authority 508 typically maintains incumbent system parameters (e.g., licensed TV transmitter parameters and allowable interference levels) and sets CR system operational requirements (e.g., maximum allowable CR system transmit power levels, etc.). In accordance with this embodiment, the central authority 508 copies and maintains a mirrored database 506 having the broadcaster's system parameter information stored therein as well as CR system operating system requirements.

In this embodiment, public safety radios 524, 544 are able to share spectrum with the broadcaster 502 by utilizing the interference control technique in conjunction with the mirrored database of the present invention. Public safety radios 524, 544 utilize their base stations 530, 540 to access 526, 546 the mirrored database 506 of central authority 508. The public safety radios 524, 544 determine their respective operating locations. Public safety radios 525, 555 then utilize their respective locations and derive location based CR system operating parameters (using geo-location algorithms or databases) based on the mirrored database information and operational requirements (which they accessed from central authority 508).

In another embodiment, the mirrored database parameters 506 of FIG. 5 can also be modified to provide priority access to public safety systems 505, 515 during time of emergency, and reserve spectrum for public safety and other higher priority users at a particular location for duration of time. The mirrored database can also be modified to, for example, reserve spectrum for temporary usage by public safety and/or other high priority users. The mirrored database parameters are scalable and can be adapted in response to changes detected in operating conditions. Mirrored database parameters may reflect a wide variety of incumbent systems, such as wireless microphone deployments or other systems.

As mentioned previously, central authority 508 can be a regulatory body or some other designated database manager. Regulatory bodies, such as the FCC, typically maintain key information about the incumbent system transmitters (e.g., effective radiated power (ERP), antenna pattern, antenna height above average terrain (HAAT), transmitter location, etc.) in a given band.

Table 1 below shows an example of some FCC-maintained licensed TV transmitter parameters and sample data.

| | |
|---|---|
| Licensee | WXYZ-TV Broadcasting, Inc. |
| FCC Service Designation | DT - Digital television station |
| Channel | 26 (716-722 Mhz) |
| File No. | ABC-2002 |
| CDBS Application ID No.: | 65680 |
| Transmitter Location: | 39° 39' 55.00" N Latitude |
| | 77° 02' 6.67" W Lon |
| Antenna ID No: | 55236 |
| Polarization | Horizontal |
| Effective Radiated Power (ERP) | 1000 Kw |
| Antenna Height Above Mean Sea Level | 550 meters |
| Antenna Height Above Average Terrain | 358.2 meters |
| Antenna Radiating Center Above Ground Level | 350.8 meters |
| Directional Antenna | pattern rotation: 90 degrees |
| Relative Field Values for Directional Antenna | 0 degrees: 0.991; |
| | 10 degrees: 0.931; |
| | ... |
| | 290 degrees: 0.962 |
| | 350 degrees: 0.975 |

Table 2 provides an example listing of typical allowable interference levels and propagation models.

| | | Protection ratios | |
|---|---|---|---|
| Type of station | Channel separation | D/U ratio (dB) | Propagation curve |
| Analog TV, Class A, LPTV, translator and booster | Co-channel | 35 | F(50, 50) |
| | Upper adjacent | −17 | F(90, 90) |
| | Lower adjacent | −15 | F(90, 90) |
| Digital TV and Class A DTV | Co-channel | 23 | F(50, 90) |
| | Upper adjacent | −26 | F(90, 90) |
| | Lower adjacent | −28 | F(90, 90) |

As seen in Table 2, a variety of incumbent systems can tolerate different interference levels depending on their transmitter/receiver types, where within the frequency band, and where within the coverage area the interference is occurring. In accordance with the embodiment of FIG. 5, the broadcaster's transmitter parameters and CR system operating requirements are copied into mirrored database 506. The broadcaster's transmitter parameters are then utilized to compute, for example, the broadcast user's (e.g. television sets) signal strength vs. geographic location, given a set of generally accepted propagation models (such as FCC approved F(50, 90) propagation models). Similarly, predefined protected service contour levels (defined per type of transmitter station) determine each station's protected service contour (or area). These parameters are typically frequency dependent.

The broadcaster's transmitter information, when combined with the set of regulatory policies and requirements for the band (e.g., allowable primary receiver co-channel interference (C/I) and adjacent channel interference (ACI) levels), is utilized to determine critical operating parameters for public safety CR systems 505, 515, such as maximum allowable public safety transmit power. Other broadcaster system parameters, such as transmitter elevation patterns, tolerable receiver alternate channel interference levels, etc., may also be considered in determining public safety CR system operating parameters. CR system transmit power is a critical parameter, since it determines the amount of interference that nearby broadcaster service (e.g., TV) receivers will receive due to public safety system operation 505, 515. It also determines the achievable data communications throughput for the operating public safety systems 505, 515. By determining maximum allowable interference levels for primary receivers, even under a wide variety of (TV) receiver equipment providers on the market and different operating conditions, concerns of regulatory bodies (such as the FCC) and incumbents can be alleviated, while public safety and other CR systems can obtain access to spectrum previously unavailable.

While propagation models, such as the FCC's F(50,50), F(50,90) and F(90,90) models shown in TABLE 2 are well-accepted, they are only statistical indicators of expected field strength (and received signal strength (RSSI), given an antenna gain). Actual RSSI can vary based on a wide variety of actual operating conditions, including terrain variations, environmental conditions, achieved antenna patterns/gains, etc. Similarly, typical primary (e.g., TV) receiver interference tolerance may vary vs. time as well (e.g., due to improvements in receiver technologies, etc.). Since these propagation models are utilized to determine the protected service area for primary users (e.g., TV broadcasters) and allowable secondary (CR system) interference levels (e.g., CR system transmit power), their accuracy in practice is of the utmost importance. Regulatory bodies or other database managers can now ensure non-interference to primary spectrum license holders in spite of all of these changing conditions via the spectrum sharing technique provided by the embodiments of the invention.

In accordance with some embodiments of the invention, the incumbent's transmitter parameters and cognitive radio operating requirements are selectively modified to eliminate cases of interference in the field. Only parameters and operating requirements in the mirrored database can be modified to correct unwanted interference cases. In this manner, modeling errors observed in the field (from any source) can be corrected in the mirrored database to alleviate interference problems in practice. For example, the most common cause of propagation modeling errors is due to non-average terrain variations. Note that while the HAAT parameter takes into account average terrain variations along equally spaced radials around the licensed transmitter, it does not account for actual terrain variations (since modeling actual terrain variations is computationally prohibitive in portable/cost-effective CR equipment and requires very large amounts of memory). Actual terrain variations may cause the service area of a primary (TV) transmitter to be greater than or less than the statistically modeled values described above in a particular direction from the transmitter. This form of error can be effectively combated by altering the primary (TV) transmitter's antenna pattern data in the direction of the error in the mirrored database (106B).

While the FCC currently maintains a database of TV transmitter parameters (as described above), the FCC may or may not be the authority that manages the mirrored database in practice though—it may delegate that authority. A designated or delegated authority may be responsible for updating information in the mirrored database. For example, regulators may authorize that these databases be maintained by licensed spectrum holders willing to enable real time spectrum trading, brokering and bidding in their spectrum holdings.

Figure 6:
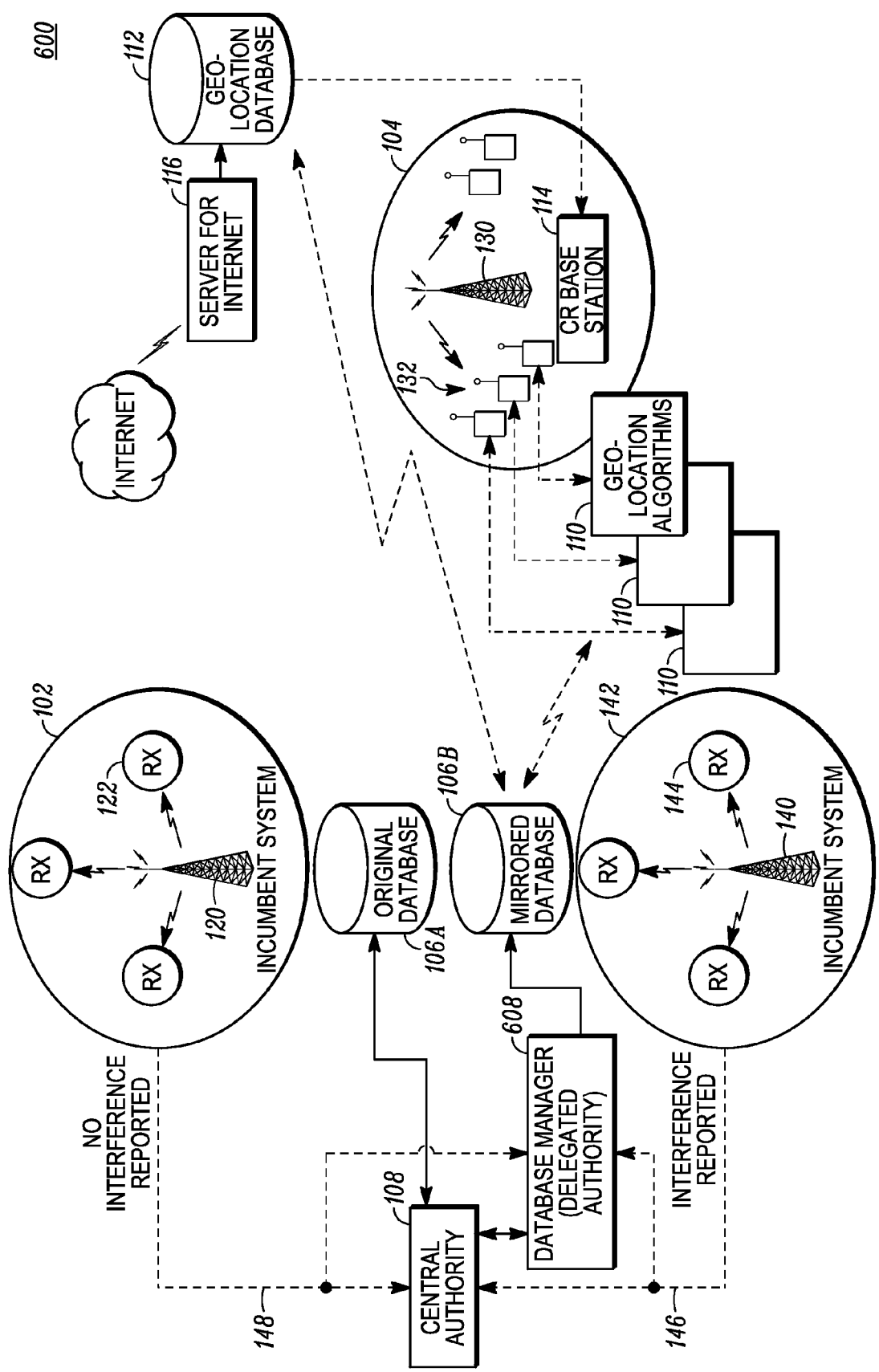
FIG. 6 provides an example of a plurality of incumbent communication systems and a cognitive radio system sharing spectrum using a delegated authority in accordance with some of the embodiments of the invention.

FIG. 6 shows a plurality of communication systems 600 sharing spectrum in accordance with another embodiment of the invention. The plurality of communication systems 600 includes incumbent communication systems 102, 142, cognitive radio system 104 and central authority 108. In accordance with these embodiments, central authority 108 (such as the FCC) has delegated authority to a third party referred to as database manager 608. Cognitive radio system 104 efficiently shares frequency spectrum with incumbent communication systems 102, 142 without interfering with the incumbent systems. In this embodiment database manager 608 maintains and updates mirrored database 106B in the same manner as was done by the central authority in the previous embodiments. Interference can be reported from the incumbent systems 102 and/or 142 to the database manager 608 and/or the central authority 108 depending on how the delegation of authority has been assigned to the database manager 608. This embodiment also extends to the public safety environment as was discussed earlier. Thus, the central authority, such as the FCC, can delegate management of the mirrored database to a database manager dedicated to operating the CR system within the public safety environment.

While FIGS. 1, 2 and 5 and 6 have shown the original/reference database 106A and mirrored database 106B as being separate entities the database can stored in a common database and maintained in the manner described. Additionally, the incumbent communications system(s) can be an existing cognitive radio system.

Global incumbent transmitter coverage and interference problems can be adjusted in this or the previous embodiments, by for example, altering any of the incumbent transmitter's parameters (e.g., ERP, antenna pattern, HAAT parameters, etc.) in the mirrored database 106B utilizing the interference control technique of the present invention. The interference control technique of the present invention allows a simple mechanism to address incumbent (e.g., primary license-holders') interference concerns, and can be easily implemented.

Similarly, other incumbent system parameters (such as protected service contour levels, or allowable C/I & ACI levels) can be maintained and adjusted in the mirrored database 106B, at whatever resolution deemed appropriate (e.g., on a nation-wide, per-region or per-station basis). The interference control technique of the present invention provides a method to effectively address a wide variety of unexpected operating conditions (such as terrain or other environmental conditions, actual receiver operating characteristics, etc.). It also allows regulators 108 and database managers 608 to keep up with technological advancements in receiver or transmission technology.

Limits can be placed on the magnitude of changes to information in the mirrored database 106B. A simple means of primary service interference verification in the field can be performed (with standard reference CR transmitters and primary licensed receivers) in cases where the license holders believe that they are being interfered with in the field. Potential interference levels (permitted by current operating regulations) can thus be verified to help quantify the necessary changes to information in the mirrored database 106B.

The mirrored database 106B of the present invention can further be made generic and adaptable by incorporating a variable number of services to protect, with standard parameters and policies (e.g., protected service contour levels, allowable C/I and ACI levels, etc.). In this manner, new licensed services in the band can be protected by adding a new class of transmitter. The technique of the present invention allows regulatory bodies and database managers to effectively adapt CR systems for new types of services/transmitters permitted to operate in licensed spectrum.

A variety of rules can be employed to address the different types of CR devices out in the field (such as sensing-only CRs, if allowed, and database-driven CRs). CR devices that access the mirrored database of incumbent system parameters and system operational requirements in a timely fashion may, for example, be allowed to operate at the maximum allowable transmit (ERP) levels allowed by current regulations. CR devices that only perform spectral sensing and do not access the database may, for example, be restricted to very low ERP levels, while CR devices that do not access the database in a timely fashion (e.g., at least weekly) may have their maximum ERP levels degraded (e.g., reduced by 5 dB/week) over time (until the baseline sensing-only CR levels were reached). Thus, the use of a mirrored database provides a scalable and adaptable framework for regulatory bodies 108 or other database managers 608 to control CR operation in the field.

Accordingly, there has been provided, a method and apparatus which allow CR system administrators to readily maintain control over actual operating interference conditions in the field, and effectively protect licensed (or higher priority) incumbents' transmission rights. Alleviating interference in the manner provided by the embodiments of the invention also allows the FCC or other bodies to readily adapt to new (radio receiver and transmitter) technologies in the field. With the high number of unknowns associated with the practical implementation of cognitive radios in the field, the described method allows critical flexibility to adapt to unexpected or unintended operating conditions, and extends the useful CR operating rules/regulations lifetime.

The method and apparatus for alleviating interference between systems sharing frequency spectrum are applicable to any communication systems sharing frequency spectrum. Thus, non-licensed, secondary-licensed, and quasi-licensed systems operating as primary systems can allow access to their spectrum by utilizing the mirroring aspect of the invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A spectrum sharing communication network, comprising:
    an incumbent communication system;
    a cognitive radio (CR) communication system with geo-location information;
    a reference database containing at least incumbent system geo-location information;
    a mirrored database having a copy of at least a portion of the reference database; and
    a database manager maintaining and updating the mirrored database, the CR communication system utilizing the CR system geo-location information to access the updated mirrored database to obtain CR system operating parameters to share spectrum with the incumbent communication system without interference, wherein the database manager comprises a delegated authority and wherein the delegated authority is designated by a central authority.

2. The spectrum sharing communication network of claim 1, wherein the reference database comprises incumbent system parameters of the incumbent communication system.

3. The spectrum sharing communication network of claim 1, wherein the reference database comprises incumbent system parameters of the incumbent communication system and CR operating requirements.

4. The spectrum sharing communication network of claim 1, wherein the mirrored database comprises CR operating requirements and incumbent system parameters.

5. The spectrum sharing communication network of claim 4, wherein the incumbent system parameters comprise one or more of: a transmitter power level, a transmitter antenna pattern, a transmitter antenna height, a transmitter protected service contour.

6. The spectrum sharing communication network of claim 1, wherein the cognitive radio communication system comprises a public safety communication system.

7. The spectrum sharing communication network of claim 1, wherein the central authority comprises a designated management body.

8. The method of claim 1, wherein the database manager maintains a service priority associated with the incumbent communication system and the CR communication system, and the service priority is utilized to determine a priority for spectrum sharing.

9. The method of claim 1, wherein the database manager computes CR system operating parameters based on the incumbent system geo-location information contained in the mirrored database and the CR system geo-location information.

10. A spectrum sharing communication network, comprising:
    an incumbent communication system;
    a cognitive radio (CR) communication system;
    a reference database;
    a mirrored database having a copy of at least a portion of the reference database; and
    a database manager maintaining and updating the mirrored database, the CR communication system utilizing the updated mirrored database to share spectrum with the incumbent communication system, wherein the incumbent communication system comprises a public safety communication system, and wherein the database manager updates the mirrored database to provide priority access to the public safety system during a time of emergency.

11. A spectrum sharing communication network, comprising:
    an incumbent communication system;
    a cognitive radio (CR) communication system;
    a reference database;
    a mirrored database having a copy of at least a portion of the reference database; and
    a database manager maintaining and updating the mirrored database, the CR communication system utilizing the updated mirrored database to share spectrum with the incumbent communication system, wherein the cognitive radio communication system comprises a public safety communication system, and wherein the database manager updates the mirrored database to provide priority access to the public safety system during a time of emergency.

12. A spectrum sharing communication network, comprising:
    an incumbent communication system;
    a cognitive radio (CR) communication system;

a reference database;

a mirrored database having a copy of at least a portion of the reference database; and a database manager maintaining and updating the mirrored database, the CR communication system utilizing the updated mirrored database to share spectrum with the incumbent communication system, wherein the database manager updates the mirrored database to reserve spectrum for public safety users.

13. A spectrum sharing communication network, comprising:

an incumbent communication system;

a cognitive radio (CR) communication system;

a reference database;

a mirrored database having a copy of at least a portion of the reference database; and a database manager maintaining and updating the mirrored database, the CR communication system utilizing the updated mirrored database to share spectrum with the incumbent communication system, wherein the mirrored database reserves spectrum for temporary usage by predetermined high priority users.

* * * * *

UNITED STATES PATENT AND TRADEMARK OFFICE
CERTIFICATE OF CORRECTION

PATENT NO.       : 7,881,726 B2  
APPLICATION NO.  : 11/831601  
DATED            : February 1, 2011  
INVENTOR(S)      : Gurney et al.

Page 1 of 1

It is certified that error appears in the above-identified patent and that said Letters Patent is hereby corrected as shown below:

On the title page, item (54), in Title, in Column 1, Line 3, delete "COMMUNICATIONS" and insert -- COMMUNICATION --, therefor.

On the title page, item (56), under "OTHER PUBLICATIONS", in Column 2, Line 9, delete "Mapenabled" and insert -- Map enabled --, therefor.

In Column 5, Line 7, delete "location" and insert -- location. --, therefor.

In Column 12, Line 22, in Claim 8, delete "method" and insert -- spectrum sharing communication network --, therefor.

In Column 12, Line 27, in Claim 9, delete "method" and insert -- spectrum sharing communication network --, therefor.

Signed and Sealed this
First Day of January, 2013

David J. Kappos
*Director of the United States Patent and Trademark Office*